United States Patent [19]

Strehler et al.

[11] 4,056,514
[45] Nov. 1, 1977

[54] CONTINUOUS MANUFACTURE OF POLYBUTYLENE TEREPHTHALATES

[75] Inventors: Hugo Strehler, Frankenthal; Ludwig Beer, Ludwigshafen; Eduard Heil, Limburgerhof; Friedrich Urbanek, Schifferstadt; Hermann Fischer, Limburgerhof, all of Germany

[73] Assignee: BASF Aktiengesellschaft, Rheinland/Pfalz, Germany

[21] Appl. No.: 668,284

[22] Filed: Mar. 18, 1976

[51] Int. Cl.$^2$ ............................................. C08G 63/16
[52] U.S. Cl. ................................. 260/75 R; 260/75 M
[58] Field of Search .................................... 260/75 R

[56]  References Cited
U.S. PATENT DOCUMENTS

| 3,167,531 | 1/1965 | Parker et al. | 260/75 R |
| 3,817,935 | 6/1974 | Beer | 260/75 R |
| 3,890,279 | 6/1975 | Wolfe, Jr. | 260/75 S |

Primary Examiner—Edward M. Woodberry
Attorney, Agent, or Firm—Keil, Thompson & Shurtleff

[57]  ABSTRACT

A process for the continuous manufacture of linear, high molecular weight, polybutylene terephthalates, in which dimethyl terephthalate is trans-esterified with 1,4-butanediol, if desired in the presence of up to 40 mole% of other starting materials which form linear polyesters, in the molar ratio of from 1:1.2 to 1:1.5, in a plurality of successive stages at temperatures rising from 160° to 230° C, the mixture thus obtained is passed, at from 230° to 270° C and from 2 mm Hg to 20 mm Hg, upward through a bundle of stationary heated tubes, and immediately thereafter through a hold tank, with the proviso that the volume of the hold tank is at least ¼ and at most 2.5 times the volume of the tube bundle and the mean residence time in the tube bundle and hold tank together is from 10 to 60 minutes, and the precondensate thus obtained is polycondensed at from 240° to 260° C and from 0.1 to 2 mm Hg. with continuous formation of thin films.

The polybutylene terephthalates manufactured by the above process may be used for the manufacture of products such as fibers, films, sheeting and injection moldings.

9 Claims, No Drawings

CONTINUOUS MANUFACTURE OF POLYBUTYLENE TEREPHTHALATES

The present invention relates to a process for the continuous manufacture of linear high molecular weight polybutylene terephthalates in a plurality of stages by trans-esterification of dimethyl terephthalate with 1,4-butanediol, if desired in the presence of up to 40 mole percent of other starting materials which form linear polyesters, in the presence of trans-esterification catalysts and at elevated temperatures, and subsequent polycondensation at elevated temperatures and at subatmospheric pressure, in the presence of polycondensation catalysts.

German Laid-Open Application No. 2,214,775 discloses the manufacture of polybutylene terephthalates by trans-esterifying dimethyl terephthalate with 1,4-butanediol in the presence of titanium catalysts and thereafter polycondensing the bis-hydroxybutyl terephthalate thus obtained, and its oligomers, at a higher temperature and subatmospheric pressure, with elimination of 1,4-butanediol. However, when this process is carried out continuously on an industrial scale, it is difficult to obtain a uniform high molecular weight polyester. Because of the thermal instability of polybutylene terephthalate, which is substantially greater than that of polyethylene terephthalate, degradation reactions occur with considerable facility at the temperatures which are used for polycondensation. This results in irreversible damage to the polyester through increased formation of carboxyl end groups and lower color quality and stability. The molecular weight of these thermally degraded products is so low that moldings manufactured therefrom do not have adequate mechanical strength. In addition, the formation of tetrahydrofuran has to be kept as low as possible both during transesterification and polycondensation, to ensure economical operation. Finally, it is also necessary to ensure that the losses of terephthalic acid, eg. from dihydroxybutyl terephthalate distilling off, are kept as low as possible.

It is an object of the present invention to provide a continuous process which, as a result of employing relatively short residence times and mild reaction conditions in the individual process, gives polybutylene terephthalate grades having a high degree of polycondensation, showing little thermal degradation, and having a good color. A further object is to keep the loss of terephthalic acid and the production of undesirable by-products, especially tetrahydrofuran, to a minimum.

We have found that these objects are achieved and that high molecular weight linear polybutylene terephthalates are obtained, more advantageously than in the prior art, in a multi-stage continuous process by trans-esterification of dimethyl terephthalate with 1,4-butanediol, if desired in the presence of up to 40 mole percent of other starting materials which form linear polyesters, and in the presence of trans-esterification catalysts, at elevated temperatures, followed by polycondensation at elevated temperatures, subatmospheric pressure and in the presence of polycondensation catalysts, by a. Trans-esterifying dimethyl terephahalate with 1,4-butanediol in the molar ratio of 1:1.2 to 1:1.5 in a plurality of successive stages at temperatures rising from 160° to 230° C in the presence of trans-esterification catalysts, and distilling methanol off continuously;

b. Subsequently passing the mixture of dihydroxybutyl terephthalate and its oligomers thus obtained, at from 230° to 270° C and from 20 to 2 mm Hg, upward through a bundle of stationary heated tubes, and passing the resulting mixture of vapor and liquid through a hold tank located immediately above the tube ends, the volume of the hold tank being at least ¼ and at most 2.5 times the volume of the tube bundle and the mean residence time in the tube bundle and hold tank together being from 10 to 60 minutes, the predominant part of the amount of heat required to heat the reaction mixture and vaporize the volatile constituents of the reaction mixture being supplied to the reaction mixture in the tubes, and the mixing of the reaction mixture being effected predominantly by the vapor bubbles rising from the tubes; and c. Polycondensing the precondensate thus obtained, at from 240° to 260° C and from 0.1 to 2 mm Hg, with continuous formation of thin films.

The advantage of the new process is that it uses very short reaction times, is simple, and does not require technically complicated apparatus. A further advantage is that the process can very easily be adapted to industrial-scale operation. Furthermore, the amounts of by-product, eg. tetrahydrofuran, formed in the new process are small. In addition, the loss of terephthalic acid by evaporation of compounds containing the acid is kept low. The polyesters produced have a relatively low content of carboxyl end groups. This has a favorable effect on the intrinsic color of the polymers and on their stability to heat, thermal oxidation and UV.

The starting compounds used are dimethyl terephthalate and 1,4-butanediol. In addition, up to 40 mole percent of saturated alkanedicarboxylic acids or cycloalkanedicarboxylic acids, or isophthalic acid or dicarboxylic acids derived from naphthalene or diphenyl, may be used, in the form of suitable esters. The use of dimethyl esters of alkanedicarboxylic acids of 4 to 12 carbon atoms, cycloalkanedicarboxylic acids of 5 to 8 carbon atoms in the ring and isophthalic acid is particularly preferred. Examples of suitable compounds are dimethyl adipate, dimethyl sebacate, dimethyl cyclohexane-1,4-dicarboxylate and dimethyl isophthalate, and corresponding dihydroxybutyl esters.

In addition to 1,4-butanediol, up to 40 mole percent of other diols, eg. alkanediols or cycloalkanediols of up to 8 carbon atoms, may be present. Examples of suitable diols are ethylene glycol, propylene glycol, 1,6-hexanediol, neopentyl glycol and 1,4-bishydroxymethylcyclohexane.

It can also be advantageous to co-condense small amounts, eg. from 0.1 to 1 mole percent, of trifunctional or polyfunctional cross-linking agents such as trimethylolpropane or trimesic acid, in order to improve the properties of the resulting material.

In a first stage, dimethyl terephthalate is trans-esterified with 1,4-butanediol, if desired in the presence of the above additional starting materials. In this stage, from 1.2 to 1.5 moles of butanediol are used per mole of dimethyl terephthalate. These molar ratios also apply to the other starting materials used at the same time. Trans-esterification is carried out in a plurality of successive reaction zones. It is advantageous to use from 2 to 6, especially from 3 to 5, reaction zones, eg. in the form of a cascade. Advantageously, good mixing is ensured by stirrers or by recycling the reaction product. During trans-esterification, a temperature rising from 160° to 230° C is maintained, for example by maintaining the first reaction zone at 160° C and increasing the temperature from stage to stage, with a temperature of 230° C being reached in the last zone. The methanol vapor evolved during trans-esterification is distilled off, together with small amounts of tetrahydrofuran, through a column operated with methanol reflux, whilst butanediol or other diols entrained in vapor form condense in the column, together with small amounts of terephthalic acid ester, and are returned to the trans-esterification stage.

Trans-esterification takes place for practical purposes at atmospheric pressure. Advantageously, the residence time in the trans-esterification stage is from 1 to 3 hours.

Trans-esterification is carried out in the presence of conventional trans-esterification catalysts, eg. soluble zinc compounds, calcium compounds or manganese compounds, especially as fatty acid salts. Titanium compounds such as titanic acid esters, eg. tetrabutyl orthotitanate, or titanyl compounds, have proved particularly suitable. The preferred amounts of catalysts used are from 0.02 to 0.3 percent by weight, based on dimethyl terephthalate.

A reaction mixture is thus obtained which consists essentially of bis-hydroxybutyl terephthalate and its oligomers having a degree of polymerization of up to 8. As a rule the average degree of polymerization is from 2 to 5. If additional starting materials are also used, corresponding trans-esterification products are, of course, contained in the reaction mixture.

The trans-esterification mixture thus obtained is passed, in a second stage, upward through a bundle of stationary heated tubes and the resulting vapor-liquid mixture is passed through a hold tank located immediately above the tubes. The L:D ratio of the individual tubes is advantageously from 75:1 to 175:1. It is an essential characteristic that the volume of the hold tank is at least ¼ and at most 2.5 times the total volume of the tube bundle. To ensure that the trans-esterification mixture introduced is distributed uniformly over all the tubes, it is advantageous to reduce the cross-sectional area of each individual tube at the lower end, for example to from 0.05 to 2.5% of the cross sectional area. The constriction is achieved, eg. by perforated discs.

Advantageously, a temperature of from 240° to 260° C and a pressure of from 2 to 20 mm Hg, especially from 2 to 10 mm Hg, is maintained during this precondensation. The total residence time in the tube bundle and hold tank is advantageously from 10 to 60 minutes; residence times of from 12 to 25 minutes have proved particularly suitable.

Most of the heat required to heat the reaction mixture and to vaporize the volatile constituents, i.e., the butanediol and other diols, is supplied to the reaction mixture in the tube. It has proved advantageous for at least 80%, and advantageously at least 90%, of the required heating surface to be formed by the actual inner surfaces of the tubes. This ensures rapid transfer of the heat to the reaction mixture since the ratio of effective heating surface to amount of reaction mixture is most advantageous within the tubes. Accordingly, it is advantageous if the entire heat transfer takes place in the tubes and the hold tank is only heated to an extent sufficient to maintain the temperature which the reaction mixture reaches in the tubes.

The reaction mixture contained in the hold tank furthermore ensures that all tubes are filled with reaction mixture. The static pressure of the liquid column ensures a pressure which increases in a downward direction so that the trans-esterification mixture entering the lower end of the tubes is not immediately exposed to the complete reduction in pressure. This prevents the evaporation of substantial amounts of dihydroxybutyl terephthalate. Mixing is essentially effected by the rising vapor bubbles of butanediol and, if present, further diols. This ensures good renewal of the surface in the reaction mixture, which also promotes heat transfer. At the same time the dihydroxybutyl terephthalate contained in the vapor phase is washed out as it passes through the liquid above it.

Catalysts used for the polycondensation stages are, in particular, the above titanium compounds, which are also effective for trans-esterification. When using titanium catalysts it is advantageous to make up their amount between the first and second polycondensation stages. The total amount of catalyst during polycondensation is again from 0.02–0.3 percent by weight, based on dimethyl terephthalate employed.

The precondensate thus obtained has, as a rule, a relative viscosity of from 1.10 to 1.19, preferably from 1.12 to 1.18. (The relative viscosity is in each case determined on an 0.5 percent strength solution in a solvent mixture of phenol and ortho-dichlorobenzene (3:2) at 25° C in an Ubbelohde viscometer).

This precondensate is passed into the next polycondensation stage. There, the precondensate is polycondensed at from 240° to 260° C, especially from 245° to 250° C, and from 0.1 to 2 mm Hg. In this stage, the continuous formation of thin films is ensured to provide continuous rapid renewal of the surface. This ensures very effective distillative removal of the butanediol contained in the polyester melt, a factor of decisive importance in ensuring that polycondensation proceeds rapidly. This film formation is effected for example, by rotating stirrers which dip partly into the melt and, as they rotate, lift the adhering melt up, with the stirrer, into the common vapor space. The third stage is advantageously in the form of a horizontal reaction zone, which the precondensate enters at one end, and flows through under gravity, the finished polycondensate being taken off at the other end. An embodiment described in German Laid-Open Application No. 2,244,664 has proved particularly advantageous. The reaction zone, which is filled to the extent of, e.g., from 30 to 50%, with the mixture to be condensed, has a shaft, on which stirrers which dip into the melt are mounted, extending along its longitudinal axis. Suitable stirrers are, eg., discs. The area of the stirrer advantageously decreases from the inlet to the outlet of the reaction zone, eg. from complete discs, through perforated discs, to spoked wheels. Preferably, the horizontal reaction zone is partitioned into individual chambers, but the partition only extends at most as far as the central axis, so that a common vapor space remains. The individual chambers are connected through passages at the bottom of the partitions. The butanediol, together with small amounts of terephthalic acid esters, is drawn off from the vapor space, condensed, and, if desired, reused after purification.

In polycondensation in the third stage, the residence time is advantageously from 1 to 3, especially from 1 to 2, hours. The polybutylene terephthalates obtained have a relative viscosity of from 1.3 to 1.9.

The polybutylene terephthalates obtained by the process of the invention may be used for the manufacture of fibers, sheeting, films and injection moldings. They may be colored with pigments and be provided with further additives, eg. glass fibers.

The Example which follows illustrates the process of the invention.

EXAMPLE a. 100 kg of dimethyl terephthalate, 70 kg of 1,4-butanediol (molar ratio of 1:1.5) and 0.05 kg of tetra-n-butyl o-titanate (0.05 percent by weight based on DMT) per hour were metered into a cascade of 4 kettles. On passing through the cascade, the reaction mixture is heated stepwise from 160° to 220° C. The vapors from the reaction mixture are passed through a joint pipeline to a column where methanol and small amounts of tetrahydrofuran are removed at the top whilst entrained 1,4-butanediol and terephthalate ester are returned to the reaction mixture. The residence time in the cascade is 120 minutes. A trans-esterification mixture of bis-hydroxybutyl terephthalate and its oligomers, having a mean degree of condensation of from 2 to 3, is obtained.

b. The trans-esterification mixture from a) is passed upward through a bundle of vertical stationary heated tubes, at the top end of which is a hold tank. The bundle comprises 7 tubes having an L:D ratio of 125:1 (length 500 cm, internal diameter 4 cm). The ratio of the total volume of the tube contents to the volume of the hold tank is 1:2. The reaction mixture is heated to 250° C in the tubes. The bubbles of 1,4-butanediol vapor which rise up ensure adequate mixing. The total residence time is 20 minutes. In the hold tank, which is under a pressure of 3 mm Hg, the vapor/liquid mixture separates. The vapor constituents are drawn off and condensed, whilst the liquid precondensate is discharged. It has a relative viscosity of 1.18. This precondensate is again mixed with 0.15 kg of tetrabutyl titanate, based on DMT.

c. The precondensate thus obtained is passed through an apparatus of the type described in German Laid-Open Application No. 2,244,664. The apparatus is divided into 9 chambers and equipped with 2 complete discs, 3 perforated discs and 4 spoked wheels. The discs rotate at 3 rpm. A temperature of 250° C and a pressure of 0.8 mm Hg is maintained during condensation and the residence time is 90 minutes. The polyester melt is subsequently filtered suitably, and passed in the form of strands through a water bath, the strands are suitably granulated and the granules obtained (about 3×3 mm) are dired at elevated temperature. A polycondensate having a relative viscosity of 1.71, a reference color number (measured on the granules) of Fs = 80% and a carboxyl end group content of 30 milliequivalents/kg is obtained.

The loss of terephthalic acid is 0.5%. A total of 3 kg of tetrahydrofuran is produced per 100 kg of polybutylene terephthalate.

COMPARATIVE EXAMPLE

If polybutylene terephthalate is prepared using the titanium catalyst described in the Example, and in accordance with the process described in German Printed Application No. 1,301,554, a relative viscosity of only 1.51 is achieved in spite of a total residence time of 14 hours. This viscosity is too low for the polybutylene terephthalate to be usable for injection molding or film and sheeting manufacture. The carboxyl end group content is up to 100 milliequivalents/kg. Furthermore, 1% of the terephthalic acid is lost. From 8 to 12 kg of tetrahydrofuran are produced per 100 kg of polybutylene terepthalate.

We claim:

1. A process for the continuous manufacture of linear, high molecular weight polybutylene terephthalates, wherein
    a. dimethyl terephthalate is reacted with 1,4-butanediol, if desired in the presence of up to 40 mole% of further starting materials which form linear polyesters, in the molar ratio of from 1:1.2 to 1:1.5 in a plurality of successive stages at temperatures rising from 160° to 230° C in the presence of trans-esterification catalysts, and methanol is distilled off continuously.
    b. the resulting mixture of dihydroxybutyl terephthalate and its oligomers is subsequently passed, at from 230° to 270° C and from 20 to 2 mm Hg, upward through a bundle of stationary heated tubes, and the resulting mixture of vapor and liquid is passed through a hold tank located immediately above the tube ends, the volume of the hold tank being at least ¼ and at most 2.5 times the volume of the tube bundle and the mean residence time in the tube bundle and hold tank together being from 10 to 60 minutes, most of the amount of heat required to heat the reaction mixture and vaporize the volatile constituents of the reaction mixture being supplied to the reaction mixture in the tubes, and the mixing of the reaction mixture being effected predominantly by the vapor bubbles rising from the tubes, and
    c. the precondensate thus obtained is polycondensed at from 240° to 260° C and from 0.1 to 2 mm Hg, with continuous formation of thin films.

2. A process as claimed in claim 1, wherein from 0.02 to 0.3% by weight of catalyst, based on dimethyl terephthalate, is used.

3. A process as claimed in claim 1, wherein titanic acid esters are used as catalysts.

4. A process as claimed in claim 1, wherein the precondensation stage b) is carried out at from 240° to 260° C.

5. A process as claimed in claim 1, wherein the precondensation stage b) is carried out at from 2 to 10 mm Hg.

6. A process as claimed in claim 1, wherein the residence time in the precondensation stage b) is from 10 to 25 minutes.

7. A process as claimed in claim 1, wherein the polycondensation stage c) is carried out at from 245° to 250° C.

8. A process as set forth in claim 1, wherein the residence time in precondensation stage c) is from 1 to 3 hours.

9. A process as set forth in claim 1, wherein the polybutylene terephthalate obtained from stage c) has a relative viscosity of from 1.3 to 1.9.

* * * * *

UNITED STATES PATENT AND TRADEMARK OFFICE
CERTIFICATE OF CORRECTION

PATENT NO. : 4,056,514
DATED : November 1, 1977
INVENTOR(S) : Hugo Strehler et al It is certified that error appears in the above-identified patent and that said Letters Patent are hereby corrected as shown below:

First page, left-hand column, line 12, insert
-- [30] Foreign Application Priority Data
    March 29, 1975  Germany . . . .  25 14 116  --.

In the Abstract, line 17, "Hg." should read --Hg,--.

Signed and Sealed this

Eighth Day of August 1978

[SEAL]

Attest:

RUTH C. MASON
*Attesting Officer*

DONALD W. BANNER
*Commissioner of Patents and Trademarks*